United States Patent
Vaidya et al.

(10) Patent No.: US 11,420,155 B2
(45) Date of Patent: Aug. 23, 2022

(54) PROCESS OF IMPROVED SULFUR CAPTURE FROM A SYNGAS MIXTURE

(71) Applicants: SAUDI ARABIAN OIL COMPANY, Dhahran (SA); Membrane Technology and Research, Inc., Newark, CA (US)

(72) Inventors: Milind M. Vaidya, Dhahran (SA); Sebastien A. Duval, Dhahran (SA); Feras Hamad, Dhahran (SA); Richard Baker, Newark, CA (US); Tim Merkel, Newark, CA (US); Kaaeid Lokhandwala, Newark, CA (US); Ivy Huang, Newark, CA (US); Ahmad A. Bahamdan, Dammam (SA); Faisal D. Al-Otaibi, Dhahran (SA)

(73) Assignees: SAUDI ARABIAN OIL COMPANY and (SA); MEMBRANE TECHNOLOGY AND RESEARCH, Newark, CA (US)

( * ) Notice: Subject to any disclaimer, the term of this patent is extended or adjusted under 35 U.S.C. 154(b) by 178 days.

(21) Appl. No.: 16/877,425

(22) Filed: May 18, 2020

(65) Prior Publication Data

US 2020/0360855 A1 Nov. 19, 2020

Related U.S. Application Data

(60) Provisional application No. 62/849,247, filed on May 17, 2019.

(51) Int. Cl.
  *B01D 53/22* (2006.01)
  *B01D 53/14* (2006.01)
  (Continued)

(52) U.S. Cl.
  CPC ....... *B01D 53/229* (2013.01); *B01D 53/1443* (2013.01); *B01D 53/1462* (2013.01);
  (Continued)

(58) Field of Classification Search
  None
  See application file for complete search history.

(56) References Cited

U.S. PATENT DOCUMENTS

| 3,896,215 A | 7/1975 | Bratzler et al. |
| 4,001,386 A | 1/1977 | Klein et al. |

(Continued)

FOREIGN PATENT DOCUMENTS

| EP | 3047895 A1 | 7/2016 |
| WO | 2011124326 A1 | 10/2011 |

OTHER PUBLICATIONS

Alqaheem et al., "Polymeric Gas-Separation Membranes for Petroleum Refining," International Journal of Polymer Science, vol. 2017, Jan. 1, 2017: pp. 1-19, <https://doi.org/10.1155/2017/4250927>.

(Continued)

*Primary Examiner* — Jason M Greene
(74) *Attorney, Agent, or Firm* — Bracewell LLP; Constance Gall Rhebergen

(57) ABSTRACT

A process for sweetening a syngas stream, the process comprising the steps of: providing a syngas stream to a nonselective amine absorption unit, the sour syngas stream comprising syngas, carbon dioxide, and hydrogen sulfide; separating the syngas stream in the nonselective amine absorption unit to obtain an overhead syngas stream and an acid gas stream; introducing the acid gas stream to a membrane separation unit, the acid gas stream comprising hydrogen sulfide and carbon dioxide; separating the acid gas stream in the membrane separation unit to produce a retentate stream and a permeate stream, wherein the retentate stream comprises hydrogen sulfide, wherein the permeate stream comprises carbon dioxide; introducing the retentate stream to a sulfur recovery unit; processing the retentate (Continued)

stream in the sulfur recovery unit to produce a sulfur stream and a tail gas stream, wherein the sulfur stream comprises liquid sulfur.

23 Claims, 8 Drawing Sheets

(51) Int. Cl.
*C10K 1/00* (2006.01)
*C10K 1/32* (2006.01)

(52) U.S. Cl.
CPC ............ *B01D 53/226* (2013.01); *C10K 1/004* (2013.01); *C10K 1/32* (2013.01); *B01D 2252/2021* (2013.01); *B01D 2252/2041* (2013.01); *B01D 2252/20431* (2013.01); *B01D 2252/20489* (2013.01)

(56) References Cited

U.S. PATENT DOCUMENTS

| | | | |
|---|---|---|---|
| 4,444,571 A * | 4/1984 | Matson | B01D 53/229 95/48 |
| 4,507,275 A | 3/1985 | Reed | |
| 4,508,699 A | 4/1985 | Schoofs | |
| 5,304,361 A | 4/1994 | Parisi | |
| 5,407,466 A | 4/1995 | Lokhandwala et al. | |
| 5,556,449 A * | 9/1996 | Baker | B01D 53/22 423/229 |
| 5,558,698 A | 9/1996 | Baker et al. | |
| 6,387,159 B1 | 5/2002 | Butwell et al. | |
| 6,565,626 B1 | 5/2003 | Baker et al. | |
| 8,518,356 B2 | 8/2013 | Schaffer et al. | |
| 9,458,014 B2 | 10/2016 | Reddy et al. | |
| 9,593,015 B2 | 3/2017 | Ballaguet et al. | |
| 9,943,802 B1 * | 4/2018 | Ballaguet | B01D 53/229 |
| 9,981,848 B2 | 5/2018 | Ballaguet et al. | |
| 2005/0005765 A1 * | 1/2005 | Siadous | B01D 53/229 95/45 |
| 2005/0135992 A1 | 6/2005 | Chow | |
| 2010/0310439 A1 | 12/2010 | Brok et al. | |
| 2012/0085973 A1 | 4/2012 | Jungst et al. | |
| 2012/0131853 A1 | 5/2012 | Thacker et al. | |
| 2013/0319231 A1 | 12/2013 | Jamal et al. | |
| 2015/0133711 A1 * | 5/2015 | Ji | B01D 53/1493 585/802 |
| 2016/0008753 A1 | 1/2016 | Corcoran, Jr. et al. | |
| 2019/0105603 A1 | 4/2019 | Bhuwania et al. | |
| 2019/0111380 A1 | 4/2019 | Dowdle et al. | |

OTHER PUBLICATIONS

International Search Report and Written Opinion for PCT Application No. PCT/US2020/033325 dated Sep. 21, 2020, 21 pages.

Kniep et al., "Field Tests of MTR Membranes for Syngas Separations: Final Report of $CO_2$-Selective Membrane Field Test Activities at the National Carbon Capture Center," Membrane Technology and Research, Inc., Dec. 15, 2017: pp. 1-27.

Peters et al., "$CO_2$ removal from natural gas by employing amine absorption and membrane technology—A technical and economical analysis," Chemical Engineering Journal, vol. 172(2-3), Aug. 1, 2011: pp. 952-960.

Ramasubramanian, "$CO_2(H_2S)$—Selective Membranes for Fuel Cell Hydrogen Purification and Flue Gas Carbon Capture: An Experimental and Process Modeling Study," Ohio State University, Dec. 31, 2013: pp. 1-270.

Vakharia, "Development of Membrane Technology for $CO_2$ Removal and $H_2$ Purification: A Techno-Economic, Lab-Scale, and Pilot-Scale Study," Ohio State University, Dec. 31, 2016: pp. 1-198.

Wang et al., "Selective removal of trace $H_2S$ from gas streams containing $CO_2$ using hollow fibre membrane modules/contractors," Science and Purification Technology, vol. 35(2), Feb. 15, 2004: pp. 125-131.

Yi et al., "Ultraselective glassy polymer membranes with unprecedented performance for energy-efficient sour gas separation," Sci. Adv., vol. 5(5), May 24, 2019: pp. 1-11.

Mahdavian et al., "Simulation of $CO_2$ and $H_2S$ Removal Using Methanol in Hollow Fiber Membrane Gas Absorber", Advances in Chemical Engineering and Science, 2012, 2, pp. 50-61.

Mirfendereski et al., Selective Removal of $H_2S$ from Gas Streams with High $CO_2\neg$ Concentralion Using Hollow Fiber Membrane Contactors, Chem. Eng. Technol., 2019, 42, No. 1, pp. 196-208.

* cited by examiner

PROCESS OF IMPROVED SULFUR CAPTURE FROM A SYNGAS MIXTURE

INCORPORATION BY REFERENCE

This application claims priority from U.S. Provisional Application No. 62/849,247, filed on May 17, 2019. This application incorporates by reference the contents of the provisional application in its entirety.

TECHNICAL FIELD

The system and methods described relate to improving hydrogen sulfide and carbon dioxide recovery. More specifically, provided are systems and methods for combined amine absorption and membrane gas separation technologies.

BACKGROUND OF THE ART

Gasification processes produce gases with varying levels of sulfur-containing contaminants, such as hydrogen sulfide. Removing sulfur-containing contaminants is important as the sulfur-containing contaminants can be reactive and toxic in syngas streams.

Current methods of removing sulfur-containing contaminants include nonselective absorption technology followed by amine absorption to enrich the hydrogen sulfide concentration of the feed to the Claus plant. However, the extent of hydrogen sulfide enrichment is limited.

Gas streams from gasification processes can also contain carbon dioxide, which also must be removed in order for the syngas to be used. When the removed carbon dioxide contains less than 0.1 mol % hydrogen sulfide the carbon dioxide stream can be treated and released to atmosphere.

Acid gas streams with low concentrations of hydrogen sulfide, such as concentrations below 30 mol %, can cause problems in Claus units. The low concentrations of hydrogen sulfide can result in low temperatures in the Claus furnace. At such low temperatures contaminants such as benzene, toluene, xylenes, and combinations of the same (BTX); mercaptans; $C_2+$ hydrocarbons cannot be destroyed. The undestroyed contaminants can result in catalyst deactivation in other parts of the Claus unit.

Selective amine absorption technologies can be used to enrich the hydrogen sulfide concentration of the Claus plant feed, but such processes tend to require large and costly columns with limited results increasing the concentration of hydrogen sulfide.

SUMMARY

The system and methods described relate to improving hydrogen sulfide and carbon dioxide recovery. More specifically, provided are systems and methods for combined amine absorption and membrane gas separation technologies.

In a first aspect, a process for sweetening a syngas stream is provided. The process includes the steps of: supplying a syngas stream to a nonselective amine absorption unit, the syngas stream comprising syngas, carbon dioxide, and hydrogen sulfide; separating the syngas stream in the nonselective amine absorption unit to obtain an overhead syngas stream and an acid gas stream; introducing the acid gas stream to a membrane separation unit, the acid gas stream having hydrogen sulfide and carbon dioxide; separating the acid gas stream in the membrane separation unit to produce a retentate stream and a permeate stream, wherein the retentate stream includes hydrogen sulfide, and wherein the permeate stream includes carbon dioxide; introducing the retentate stream to a sulfur recovery unit; processing the retentate stream in the sulfur recovery unit to produce a sulfur stream and a tail gas stream, wherein the sulfur stream comprises liquid sulfur.

The concentration of hydrogen sulfide in the retentate stream can be between 20 and 95 mol %, preferably between about 50 and 95 mol %, more preferably between about 80 and 95 mol %, even more preferably between about 90 and 95 mol %. The concentration of hydrogen sulfide in the retentate stream can be greater than 90 mol %. The concentration of hydrogen sulfide in the permeate stream can be between 0.01 and 0.1 mol %. According to at least one embodiment, the process can include the step of discharging the permeate stream to the atmosphere without subjecting the permeate stream to any additional hydrogen sulfide separation. The concentration of hydrogen sulfide in the overhead syngas stream can be between 1 and 1,000 ppm. The concentration of carbon dioxide in the overhead syngas stream can be between 1 and 3 mol %. The membrane separation unit can include a carbon dioxide-selective membrane. The membrane can have carbon dioxide-hydrogen sulfide selectivity of at least 5, alternately at least 10, alternately at least 20, alternately at least 30. The membrane can include a perfluorinated polymer. The membrane separation unit can include a first membrane separation stage and a second membrane separation stage with the first and second membrane separation stages arranged in a retentate-in series configuration. The membrane separation unit can include a first membrane separation stage and a second membrane separation stage with the first and second membrane separation stages arranged in a permeate-in series configuration.

According to at least one embodiment, the process can include the steps of supplying the permeate stream to a selective amine absorption unit and treating the permeate stream using an amine absorption process to obtain an overhead carbon dioxide stream and a recovered hydrogen sulfide stream. According to at least one embodiment, the process can also include the step of discharging the overhead carbon dioxide stream to the atmosphere without subjecting the overhead carbon dioxide stream to the atmosphere without subjecting the overhead carbon dioxide stream to any additional hydrogen sulfide separation.

In a second aspect, a process for recovering sulfur and carbon dioxide form a syngas stream is provided. The Process includes the steps of: supplying a syngas stream to a nonselective amine absorption unit, the syngas stream comprising syngas, carbon dioxide, and hydrogen sulfide; separating the syngas stream in the nonselective amine absorption unit using an amine absorption process to produce an overhead syngas stream and an acid gas stream; introducing the acid gas stream to a selective amine absorption unit; processing the acid gas stream in the selective amine absorption unit to obtain an overhead carbon dioxide stream and a recovered hydrogen sulfide stream; introducing the recovered hydrogen sulfide stream to a membrane separation unit, the recovered hydrogen sulfide stream having hydrogen sulfide and carbon dioxide; separating the recovered hydrogen sulfide stream in the membrane separation stage to produce a retentate stream and a permeate stream, wherein the retentate stream includes hydrogen sulfide, wherein the permeate stream includes carbon dioxide; introducing the retentate stream to a sulfur recovery unit; and processing the retentate stream in the sulfur recovery unit to produce a sulfur stream and a tail gas stream, wherein the sulfur stream includes liquid sulfur.

The concentration of hydrogen sulfide in the retentate stream can be between 80 and 95 mol %. The concentration of hydrogen sulfide in the overhead carbon dioxide stream can be between 0.01 and 0.1 mol %. According to at least one embodiment, the process can include the step of discharging the overhead carbon dioxide stream to the atmosphere without subjecting the overhead carbon dioxide stream to any additional hydrogen sulfide separation. The membrane separation unit can include a carbon dioxide-selective membrane. The membrane can have carbon dioxide-hydrogen sulfide selectivity of at least 5. According to at least one embodiment, the membrane separation unit can include a first membrane separation stage and a second membrane separation stage with the first and second membrane separation stages arranged in a retentate-in-series configuration. According to at least one embodiment, the membrane separation unit can include a first membrane separation stage and a second membrane separation stage with the first and second membrane separation stages arranged in a permeate-in-series configuration.

BRIEF DESCRIPTION OF THE DRAWINGS

These and other features, aspects, and advantages of the present embodiments will be better understood with regard to the following descriptions, claims, and accompanying drawings. The drawings illustrate only several embodiments and are therefore not to be considered limiting of the scope as it can admit to other effective embodiments.

DETAILED DESCRIPTION

Figure 1:
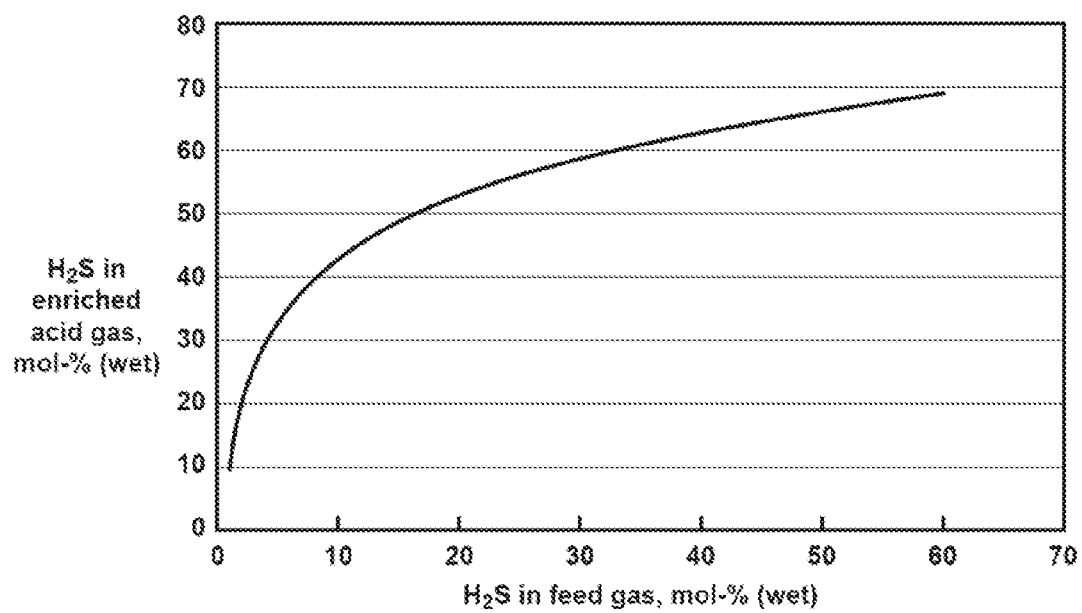
FIG. 1 is a plot of hydrogen sulfide concentration in hydrogen sulfide-enriched acid gas as a function of hydrogen sulfide in the feed gas to a selective amine absorption unit.
Figure 2:
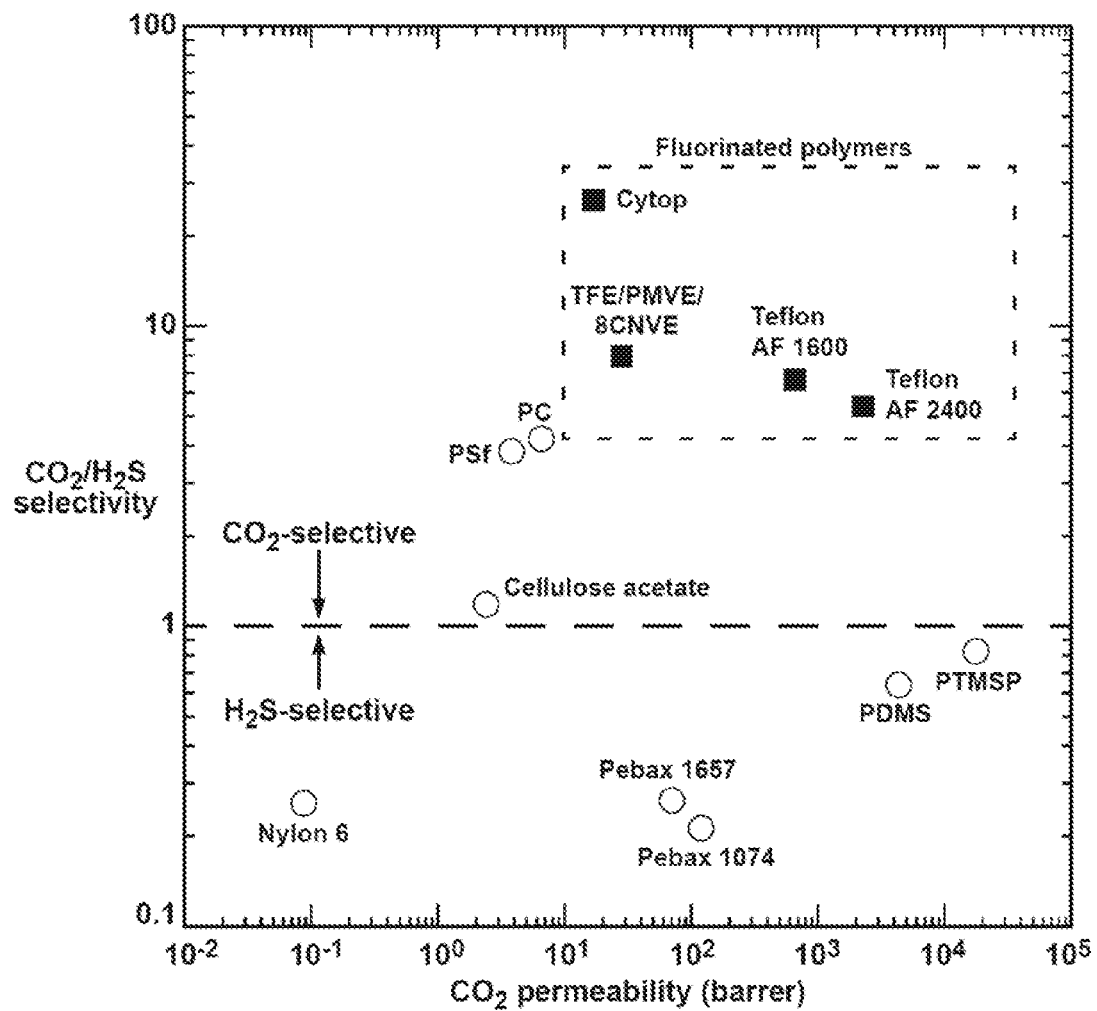
FIG. 2 is a plot of carbon dioxide-hydrogen sulfide selectivity and carbon dioxide permeability for various membrane materials.

While several embodiments will be described, it is understood that one of ordinary skill in the relevant art will appreciate that many examples, variations and alterations to the apparatus and methods described herein are within the scope and spirit of the embodiments. Accordingly, the exemplary embodiments described herein are set forth without any loss of generality, and without imposing limitations, on the claimed embodiments.

The embodiments described here are directed to hybrid processes and systems containing both membrane units and amine absorption processes to produce sweetened syngas, enriched hydrogen sulfide gas streams, and enriched carbon dioxide gas streams. Advantageously, the hybrid process results in an overall sulfur recovery process with enhanced efficiency and economics compared to a conventional process. Advantageously, the processes and systems described here can remove carbon dioxide resulting in an enriched hydrogen sulfide stream to the sulfur recovery unit, which can reduce the amount of carbon dioxide in the tail gas treatment process of the Claus plant, reducing the complexity and cost to operate of the tail gas treatment process. Advantageously, the combination of membrane units and amine absorption process can reduce or eliminate the build-up of carbon dioxide due to recycling gases in the Claus plant when the Claus plant feed has high concentration of carbon dioxide. Advantageously, the combination of membrane units and amine absorption process can eliminate the use of an absorption process in the tail gas treatment unit resulting in improved sulfur recovery and reduced capex savings. Advantageously, the combination of membrane units and amine absorption process results in increased recovery of carbon dioxide for use in enhanced oil recovery operations and more efficient sequestration of carbon dioxide as compared to the use of an amine absorption process alone. Advantageously, removal of the contaminants from the feed to the amine absorption process can reduce or eliminate foaming and other operability issues in the amine absorption process. Advantageously, the combination of membrane units and an amine absorption process improves the Claus unit operability and efficiency resulting in improved sulfur recovery and minimized sulfur dioxide emission from the incinerator stack. Advantageously, removing carbon dioxide through the combination of membrane units and amine absorption process results in increased destruction of contaminants in the furnace of the Claus unit and improved efficiency.

As used here, "syngas" refers to a mixture of hydrogen and carbon monoxide.

As used here, "overall recovery of sulfur" or "sulfur recovery" refers to the percentage of sulfur removed based on the amount of sulfur present in the acid gas feed stream. A recovery of 99.0% means that 99.0% of the sulfur in the acid gas feed stream is recovered as part of the recovered sulfur stream.

As used here, "permeate," as a verb means to spread through or flow through or pass through a membrane. As an example, liquids and gases can permeate a membrane. As a noun, permeate can refer to the liquids and gases that have permeated the membrane of a membrane unit.

Syngas streams obtained from the gasification of carbonaceous fuels such as coal, petroleum coke, and organic materials such as biomass and municipal waste generally contain some amount of hydrogen sulfide that must be removed. Large amounts of carbon dioxide should also be removed so that the syngas can be used in various applications. A hydrogen sulfide-stripped carbon dioxide-enriched stream that is separated from a syngas stream can be discharged after converting hydrogen sulfide to sulfur dioxide if the concentration of hydrogen sulfide in the stream is less than 0.1 mol %, preferably less than 0.01 mol %; for example between about 0.001 and 0.1 mol % hydrogen sulfide, alternately between about 0.01 and 0.1 mol %.

According to at least one embodiment, the hydrogen sulfide-stripped carbon dioxide-enriched stream can be safely discharged to the atmosphere after converting hydrogen sulfide in the stream to a less harmful sulfur compound. For example, the hydrogen sulfide-stripped carbon dioxide-enriched stream can be oxidized to convert hydrogen sulfide in the stream to sulfur dioxide, and then optionally stripped of sulfur dioxide, before being discharged to the atmosphere. Preferably, the hydrogen sulfide-stripped carbon dioxide-enriched stream is suitable for discharging to the atmosphere in the absence of any additional hydrogen sulfide separation (e.g., by absorption, membrane separation, distillation, or adsorption).

If the concentration of hydrogen sulfide is greater than 0.1 mol %, the bulk of the hydrogen sulfide in the syngas must be converted to sulfur. Typically, this requires concentrating the hydrogen sulfide into a stream containing at least 20 mol % hydrogen sulfide so that it can be treated in a Claus plant. According to at least one embodiment, the processes disclosed are capable of producing a hydrogen sulfide-stripped carbon dioxide-enriched stream containing between about 0.001 and about 0.1 mol % hydrogen sulfide, alternately between about 0.01-0.1 mol %.

According to at least one embodiment, a product of the process can include a syngas stream having less than about 5 ppm hydrogen sulfide, preferably less than about 1 ppm hydrogen sulfide, and more preferably between 0.1 and 0.5 ppm hydrogen sulfide; and less than about 5 mol % carbon dioxide, preferably less than about 2 mol % carbon dioxide, more preferably less than about 1 mol % carbon dioxide. According to at least one embodiment, a product of the process can include a hydrogen sulfide-enriched stream containing at least about 20 mol % hydrogen sulfide, preferably at least about 50 mol % hydrogen sulfide, and more preferably greater than about 90 mol %.

This disclosure discusses nonselective absorption processes and selective absorption processes. Nonselective absorption processes are typically used to separate hydrogen sulfide and carbon dioxide from a feed stream such as syngas to produce a product stream suitable for use downstream. Selective absorption processes are configured to preferentially remove most or all of a particular acid gas component (such as hydrogen sulfide), and may remove only a portion of another acid gas component (such as carbon dioxide).

A liquid solvent for selectively removing acid gas components (e.g., hydrogen sulfide, carbon dioxide, carbonyl sulfide, etc.) from syngas can be used in an absorption process to remove hydrogen sulfide, carbon dioxide, and other contaminants. The efficiency of the process will be determined by certain absorption characteristics of the solvent. Absorption can be a simple physical solution of the gases or it can involve a reversible chemical reaction between the specific gases and some components of the solvent mixture.

Suitable physical solvents for carbon dioxide separation include methanol at temperatures between −20 and −30° C. (the Rectisol® process), dimethyl ethers of polyethylene glycol, DMPEG (the Selexol® process), and n-methylpyrrolidone, NMP (the Purisol® process). Suitable chemical solvents include aqueous amine solutions of mono- and diethanolamine (MEA; DEA), and methyl diethanolamine (MDEA) and diisopropanolamine (DIPA). Methyl diethanolamine is the most commonly used chemical solvent.

Chemical absorption is suitable for removing carbon dioxide from a carbon dioxide-containing gas if the concentration of carbon dioxide in the gas is relatively low (i.e., less than about 15 mol %) and at moderate pressure (i.e., between about 10-30 bar). However, physical absorption may be preferred if the carbon dioxide-containing gas has a concentration of carbon dioxide that is greater than about 15 mol % or pressure that is greater than about 30 bar. For example, physical absorption processes such as Rectisol®, Selexol®, or Purisol® may be preferable for a gas with a concentration of carbon dioxide greater than about 20 mol % or a pressure greater than about 40 bar.

Some nonselective amine absorption processes can involve using MEA to remove carbon dioxide and hydrogen sulfide to produce a product gas containing between about 1 and 2 mol % carbon dioxide and less than about 1 ppm hydrogen sulfide. The acid gases removed are typically collected in a stream with a concentration of hydrogen sulfide that varies widely. In some instances, the concentration of hydrogen sulfide in the stream is sufficiently high to be sent directly to a sulfur recovery unit. However, it is common for the stream to be treated to enrich hydrogen sulfide for the sulfur recovery process.

An example of a selective amine absorption process involves using MDEA to selectively separate hydrogen sulfide from a stream containing both hydrogen sulfide and carbon dioxide. FIG. 1 shows a plot of hydrogen sulfide concentration in a recovered hydrogen sulfide-enriched gas from a selective amine absorption process as a function of concentration of hydrogen sulfide in the feed gas to the process. In such a process, the MDEA selectively absorbs nearly all of the hydrogen sulfide in the feed gas along with a portion of the carbon dioxide in the feed gas. Because a portion of the carbon dioxide is also absorbed, the process results in only partial enrichment of hydrogen sulfide. The concentration of hydrogen sulfide in the stripped feed gas will typically be less than 20-50 ppm, or less than between 50-100 ppm. In some instances, the stripped feed stream can be catalytically or thermally oxidized and then safely released to the atmosphere without additional treatment. As shown in FIG. 1, the amine absorption process is most effective at treating a feed gas having a relatively low concentration (i.e., less than about 20 mol %) of hydrogen sulfide. For streams having a greater concentration of hydrogen sulfide, the effectiveness of the process is rather marginal.

Membrane separation productivity is described by flux, or the volumetric flow of permeate through the membrane (with units of volume per area per time). The permeability of a membrane refers to its flux sensitivity to the average difference in pressure across the membrane (or transmembrane pressure). A useful measure of the separating power of a membrane is its selectivity ($\alpha_{ij}$), which is the ratio of the relative concentrations of components i and j in the permeate stream to those in the feed stream. By convention, the component with greater passage through the membrane is designated as component i so that the selectivity factor is greater than one. The selectivity of a membrane can be determined using the diffusion coefficients, $D_i$ and $D_j$, and gas sorption coefficients, $K_i$ and $K_j$, for the respective components as shown in Equation 1.

$$\alpha_{ij} = \left[\frac{D_i}{D_j}\right]\left[\frac{K_i}{K_j}\right] \qquad \text{Eqn. 1}$$

The ratio of diffusion coefficients for the two components is referred to as the mobility selectivity, and the ratio of sorption coefficients is referred to as sorption selectivity. For polymer membranes, smaller molecules generally diffuse more readily than larger molecules, which results in a larger diffusion coefficient. On the other hand, smaller molecules generally result in a smaller sorption coefficient because they are less condensable than larger molecules. When the two components to be separated are hydrogen sulfide and carbon dioxide, mobility selectivity favors carbon dioxide (kinetic diameter of 3.3 Å) over hydrogen sulfide (kinetic diameter of 3.6 Å); and sorption selectivity favors hydrogen sulfide over carbon dioxide.

Generally, the sorption selectivity term for a hydrogen sulfide-selective membrane predominates over the mobility selectivity term; and vice versa for a carbon dioxide-selective membrane. An example of a type of hydrogen sulfide-selective membrane includes rubbery polar membranes. An example of a type of carbon dioxide-selective membrane includes glassy hydrophobic polymers. FIG. 1 shows a logarithmic plot of permeability and selectivity for various materials. The plot shows that the perfluorinated family of polymers has suitable carbon dioxide/hydrogen sulfide selectivity combined with suitable carbon dioxide permeability. Membranes made of these materials are particularly suitable for use in the processes described in this disclosure. Generally, the hydrogen sulfide enrichment processes described in this disclosure can be carried out without using hydrocarbon-selective membrane separation. According to at least one embodiment, the membrane stages of the processes described in this disclosure can be carried out without the use of a hydrocarbon-selective membrane (e.g., a silicone rubber polydimethylsiloxane-type rubbery polymer or its equivalent), and the systems disclosed can be in the absence of such a membrane.

In some embodiments, the membrane can have a carbon dioxide/hydrogen sulfide selectivity of at least 10 and a carbon dioxide permeance of at least 500 gpu. In some instances, membranes having carbon dioxide/hydrogen sulfide selectivity of 20 are used. In some instances, membranes having carbon dioxide/hydrogen sulfide selectivity of 30 are used. In some instances, the membrane can have carbon dioxide/hydrogen sulfide selectivity between about 10 and 30, preferably between about 20 and 30. According to at least one embodiment, the membrane can have a carbon dioxide/hydrogen sulfide selectivity of at least 30.

Figure 3:
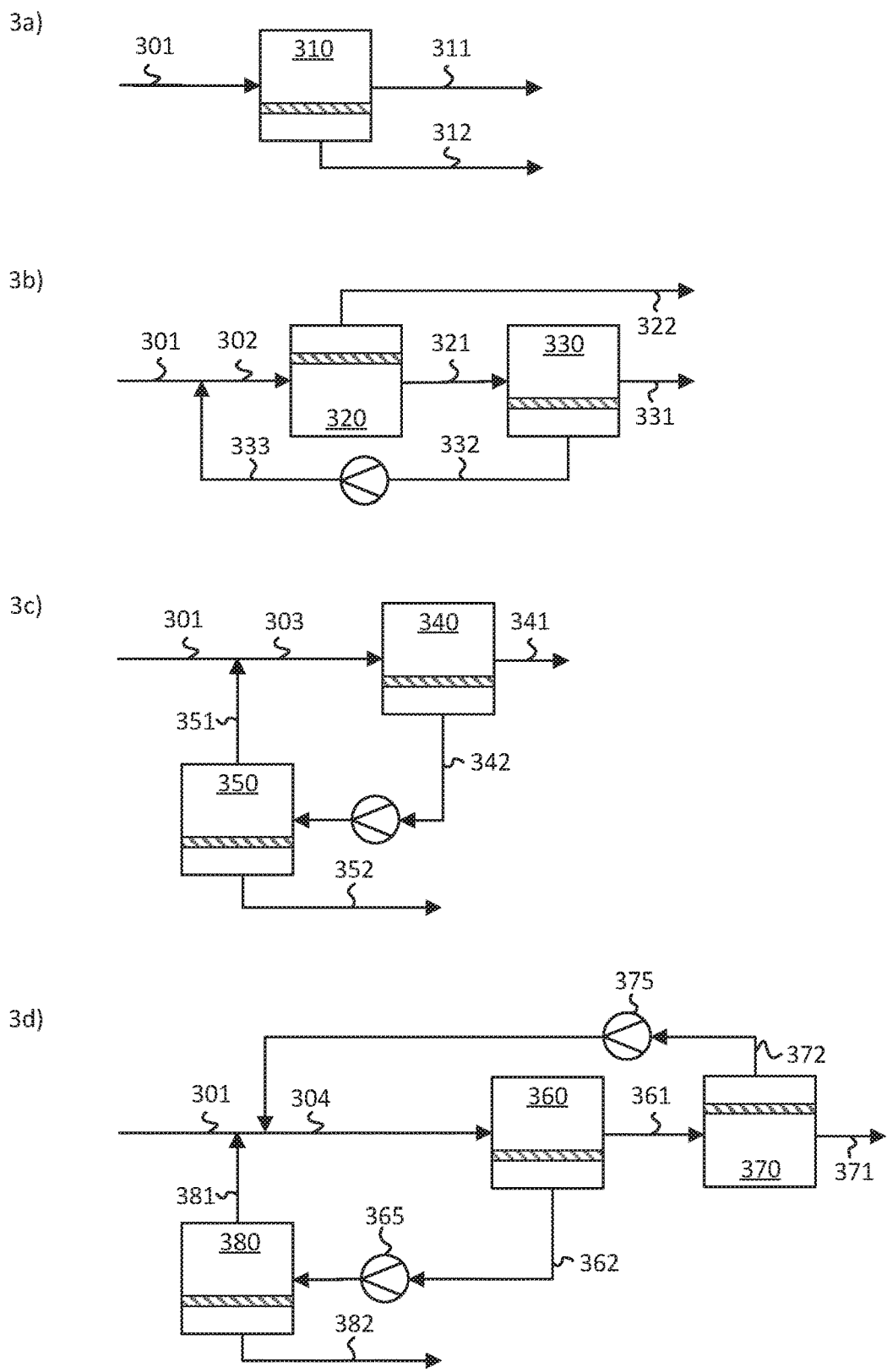
FIG. 3 is an illustration of various process flow diagrams of different membrane stage configurations.

A membrane stage can include one or multiple membrane modules in various configurations. And a membrane separation unit can include one or multiple membrane separation stages in various configurations. By way of example, various membrane stage configurations are shown in FIG. 3: a single-pass membrane configuration in FIG. 3a; a two-stage configuration with retentate in series in FIG. 3b; a two-stage configuration with permeate in series in FIG. 3c; and a three-stage configuration in FIG. 3d.

FIG. 3a is the simplest configuration with a single membrane stage. In FIG. 3a, feed-gas stream 301 is fed to single-pass membrane stage 310 where it is introduced to a carbon dioxide-selective membrane to obtain single-pass retentate stream 311 and single-pass permeate stream 312; the single-pass retentate stream 311 and the single-pass permeate stream 312 being enriched in hydrogen sulfide and carbon dioxide respectively.

FIG. 3b involves two membrane stages with retentate from the first stage being fed to the next stage. In FIG. 3b, feed-gas stream 301 can be combined with compressed second-stage permeate stream 333 to obtain mixed feed-gas stream 302. Mixed feed-gas stream 302 is fed to first retentate-in-series membrane stage 320 where it is separated using a carbon dioxide-selective membrane to obtain first retentate-in-series retentate stream 321 and first retentate-in-series permeate stream 322; the first retentate-in-series retentate stream 321 and the first retentate-in-series permeate stream 322 being enriched in hydrogen sulfide and carbon dioxide respectively. The first retentate-in-series retentate stream 321 is then introduced to second retentate-in-series membrane stage 330, where it is separated using a carbon dioxide-selective membrane to obtain second retentate-in-series retentate stream 331 and second retentate-in-series permeate stream 332; the second retentate-in-series retentate stream 331 and the second retentate-in-series permeate stream 332 being enriched in hydrogen sulfide and carbon dioxide respectively. The second retentate-in-series permeate stream 332 is compressed and combined with feed-gas stream 301 to be recycled through the process.

FIG. 3c involves two membrane stages with permeate from the first stage being fed to the next stage. In FIG. 3c, feed-gas stream 301 is combined with second permeate-in-series retentate stream 351 from second permeate-in-series membrane stage 350 to obtain first-stage feed-gas stream 303. The first-stage feed-gas stream 303 is introduced to first permeate-in-series membrane stage 340 where it is separated using a carbon dioxide-selective membrane to obtain first permeate-in-series retentate stream 341 and first permeate-in-series permeate stream 342; the first permeate-in-series retentate stream 341 and the first permeate-in-series permeate stream 342 being enriched in hydrogen sulfide and carbon dioxide respectively. First permeate-in-series permeate stream 342 is compressed and then introduced to second permeate-in-series membrane stage 350 where it is separated using a carbon dioxide-selective membrane to obtain second permeate-in-series retentate stream 351 and second permeate-in-series permeate stream 352; the second permeate-in-series retentate stream 351 and the second permeate-in-series permeate stream 352 being enriched in hydrogen sulfide and carbon dioxide respectively. The second permeate-in-series retentate stream 351 is then combined with feed-gas stream 301.

FIG. 3d is an illustration of a system and process that combines elements of the systems and processes shown in FIGS. 3b and 3c. It includes three membrane stages with retentate and permeate from the first stage separately in series with the other two stages. In FIG. 3d, feed-gas stream 301 is combined with second membrane-stage permeate stream 372 and third membrane-stage retentate stream 381 from second membrane stage 370 and third membrane stage 380 respectively to obtain mixed feed-gas stream 304. Mixed feed-gas stream 304 is introduced to first membrane stage 360 where it is separated in the presence of a carbon dioxide-selective membrane to obtain first retentate stream 361 and first permeate stream 362.

First retentate stream 361 is then introduced to second membrane stage 370 where it is separated using a carbon dioxide-selective membrane to obtain second membrane-stage retentate stream 371 and second membrane-stage permeate stream 372. Second membrane-stage retentate stream 371 is enriched in hydrogen sulfide and can be sent to a sulfur recovery unit. Second membrane-stage permeate stream 372 is enriched in carbon dioxide; it is compressed and combined with feed-gas stream 301 to be recycled through the system.

First permeate stream 362 is compressed and then fed to third membrane stage 380 where it is separated using a carbon dioxide-selective membrane to obtain third membrane-stage retentate stream 381 and third membrane-stage permeate stream 382. The third membrane-stage permeate stream 382 is enriched in carbon dioxide and can be treated to remove any remaining hydrogen sulfide, or in some instances captured for use in appropriate industrial applications or discharged into the atmosphere. The third membrane-stage retentate stream 381 can be combined with the feed-gas stream 301 to be recycled through the system.

Each of the processes illustrated in FIG. 3 produce streams that are stripped of hydrogen sulfide. Typically, these streams can contain between about 0.1 and 0.15 mol % (1,000-1,500 ppm) hydrogen sulfide. In some locations, such streams can be safely discharged to the atmosphere after catalytic or thermal oxidation to convert remaining hydrogen sulfide to sulfur dioxide. Streams with a concentration of hydrogen sulfide greater than about 0.1-0.15 mol % can be treated to remove at least some remaining hydrogen sulfide using a polishing step. Such processes can include chemical polishing (such as a reaction of hydrogen sulfide with zinc oxide), molecular sieve adsorption, or a selective amine absorption process. The polished gas can be catalytically or thermally oxidized and discharged, and the stripped hydrogen sulfide can be recycled.

The processes illustrated in FIG. 3 were simulated to illustrate some of their features. The processes were simulated using a feed gas containing 2 mol % hydrogen sulfide and using enough membrane to produce a residue gas containing 20 mol % hydrogen sulfide, 50 mol % hydrogen sulfide, and 90 mol % hydrogen sulfide. The membranes used were assumed to have 500 gpu carbon dioxide permeance and 16.7, 25, or 50 gpu hydrogen sulfide permeance. This results in carbon dioxide-hydrogen sulfide selectivity of 30, 20, or 10. Each of the processes was capable of producing a stream with a concentration of hydrogen sulfide between about 20 and 90 mol %. The lower limit is the minimum concentration of hydrogen sulfide suitable for a feed to a Claus plant. Claus plant efficiency generally increases with greater concentration of hydrogen sulfide. In some instances a concentration greater than about 90 mol % hydrogen sulfide can be achieved. Significant capital and operating cost savings can be achieved using a feed gas to a Claus plant that contains greater than 90 mol % hydrogen sulfide.

To illustrate the process of FIG. 3*a*, a feed-gas containing 2 mol % hydrogen sulfide and 98 mol % carbon dioxide was fed to a process having the configuration shown in FIG. 3*a* at a rate of 1,000 m³/h and 15 bar pressure. The single-pass permeate stream 312 was fixed at 1 bar pressure. The results show that the residual concentration of hydrogen sulfide in single-pass retentate stream 311 decreases as membrane selectivity increases from 5-30. But even at 30 selectivity and with only 20 mol % hydrogen sulfide in the feed-gas stream 301, the single-pass retentate stream 311 still has a concentration of hydrogen sulfide (0.2 mol %) that is not suitable for venting to the atmosphere after catalytic or thermal oxidation. In these instances, the single-pass retentate stream 311 must be treated to reduce the concentration of hydrogen sulfide to an acceptable level, or it must be recycled to a convenient stage in the gas treatment plant.

The single-pass membrane configuration shown in FIG. 3*a* is the simplest, least costly configuration, but may not be suitable for producing a hydrogen sulfide-stripped stream that can be safely discharged or used in other applications without undergoing any additional hydrogen sulfide separation unless more selective membranes are used. For a feed gas having 2 mol % hydrogen sulfide, a suitable configuration would be capable of producing a permeate stream with a molar concentration of hydrogen sulfide reduced by at least a factor of 5, preferably at least a factor of 10. With membrane selectivity of 5 and 10, the molar concentration of hydrogen sulfide is only reduced by a factor of about 1.2-4 (Table 1).

TABLE 1

Single-pass membrane configuration performance: $H_2S$ recovery using a feed-gas stream containing 2 mol % $H_2S$

| Selectivity | $H_2S$ in single-pass permeate stream 312 (mol %) | Recovered $H_2S$ (%)[a] | Membrane area (m²) |
|---|---|---|---|
| Twenty mole percent $H_2S$ in single-pass retentate stream | | | |
| 5 | 1.03 | 51 | 52 |
| 10 | 0.56 | 74 | 51 |
| 20 | 0.29 | 87 | 51 |
| 30 | 0.2 | 91 | 51 |
| Fifty mole percent $H_2S$ in single-pass retentate stream | | | |
| 5 | 1.32 | 35 | 55 |
| 10 | 0.77 | 62 | 55 |
| 20 | 0.41 | 80 | 55 |
| 30 | 0.28 | 86 | 55 |
| Ninety mole percent $H_2S$ in single-pass retentate stream | | | |
| 5 | 1.64 | 18 | 56 |
| 10 | 1.09 | 46 | 58 |
| 20 | 0.63 | 69 | 58 |
| 30 | 0.45 | 78 | 58 |

[a]Percent $H_2S$ from the feed-gas stream that is recovered in the single-pass retentate stream.

To illustrate the process of FIG. 3*b*, a feed-gas containing 2 mol % hydrogen sulfide and 98 mol % carbon dioxide was fed to a process having the configuration shown in FIG. 3*b* (Table 2). In this configuration, the first retentate-in-series permeate stream 322 contains about 0.1-0.3 mol % hydrogen sulfide. The first retentate-in-series retentate stream 321 is processed in second retentate-in-series membrane stage 330 to obtain 20-90 mol % hydrogen sulfide in second retentate-in-series retentate stream 331, which includes 85-95% of hydrogen sulfide from feed-gas stream 301 (Table 2). The second retentate-in-series permeate stream 332 contains about 2 mol % hydrogen sulfide, which is similar to the concentration of hydrogen sulfide in the feed-gas stream 301; an efficient use of this stream is to combine it with feed-gas stream 301 to be recycled through the process. This configuration is suitable for producing a hydrogen sulfide-stripped stream that can be safely discharged or used in other applications without additional hydrogen sulfide separation when membranes having carbon dioxide-hydrogen sulfide selectivity of 20 or more are used; membranes with less selectivity may be unsuitable for this purpose.

TABLE 2

Two-stage retentate-in-series configuration performance: H₂S recovery using a feed-gas stream containing 2 mol % H₂S

| Selectivity | $H_2S$ in first retentate-in-series permeate stream 322 (mol %) | Re-covered $H_2S$ (%)[a] | Membrane area (m²) MS 320 | Membrane area (m²) MS 330 | Theoretical compressor power (kW) |
|---|---|---|---|---|---|
| Twenty mole percent H₂S in second retentate-in-series retentate stream | | | | | |
| 5  | 0.65 | 70 | 51 | 20 | 38 |
| 10 | 0.31 | 86 | 50 | 19 | 35 |
| 20 | 0.15 | 93 | 49 | 18 | 34 |
| 30 | 0.10 | 96 | 49 | 18 | 33 |
| Fifty mole percent H₂S in second retentate-in-series retentate stream | | | | | |
| 5  | 0.71 | 65 | 53 | 33 | 59 |
| 10 | 0.32 | 85 | 53 | 27 | 48 |
| 20 | 0.15 | 93 | 52 | 25 | 43 |
| 30 | 0.10 | 95 | 52 | 24 | 41 |
| Ninety mole percent H₂S in second retentate-in-series retentate stream | | | | | |
| 5  | 0.82 | 59 | 54 | 61 | 109 |
| 10 | 0.35 | 83 | 54 | 40 | 68 |
| 20 | 0.16 | 92 | 54 | 33 | 53 |
| 30 | 0.10 | 95 | 53 | 31 | 49 |

MS, membrane stage

[a]Percent H₂S from the feed-gas stream that is recovered in the second retentate-in-series retentate stream.

To illustrate the process of FIG. 3c, a feed-gas containing 2 mol % hydrogen sulfide and 98 mol % carbon dioxide was fed to a process having the configuration shown in FIG. 3c. In this configuration, the process was simulated to achieve 20, 50, and 90 mol % hydrogen sulfide concentration in first permeate-in-series retentate stream 341 (Table 3). After processing in first permeate-in-series membrane stage 340, the stream 342 was compressed to increase pressure from 1 bar to 15 bar and then sent to second permeate-in-series membrane stage 350. The second permeate-in-series retentate stream 351, which contained about 2 mol % hydrogen sulfide, was combined with the feed-gas stream 301 to be recycled through the process. About 95-99% of the hydrogen sulfide in feed-gas stream 301 was concentrated in first permeate-in-series retentate stream 341, and only a few percent ends up in second permeate-in-series permeate stream 352 (Table 3).

Using membranes in this configuration with carbon dioxide-hydrogen sulfide selectivity of at least 10 produces a second permeate-in-series permeate stream 352 that has a sufficiently low concentration of hydrogen sulfide to allow safe discharge without further treatment (other than catalytic or thermal oxidation). For example, the second permeate-in-series permeate stream 352 has only 200-600 ppm hydrogen sulfide if membranes with carbon dioxide-hydrogen sulfide selectivity of at least 20 are used in this configuration. But the improvement comes at the cost of a significant increase in membrane area and compressor power as compared with simpler configurations.

TABLE 3

Two-stage permeate-in-series configuration performance: H₂S recovery using a feed-gas stream containing 2 mol % H₂S

| Selectivity | $H_2S$ in second permeate-in-series permeate stream 352 (mol %) | Recovered $H_2S$ (%)[a] | Membrane area (m²) MS 340 | Membrane area (m²) MS 350 | Theoretical compressor power (kW) |
|---|---|---|---|---|---|
| Twenty mole percent H₂S in first permeate-in-series retentate stream | | | | | |
| 5  | 0.30  | 86 | 89 | 49 | 177 |
| 10 | 0.10  | 95 | 66 | 48 | 181 |
| 20 | 0.035 | 98 | 58 | 48 | 115 |
| 30 | 0.018 | 99 | 55 | 48 | 110 |
| Fifty mole percent H₂S in first permeate-in-series retentate stream | | | | | |
| 5  | 0.34  | 83 | 131 | 52 | 259 |
| 10 | 0.13  | 94 | 83  | 52 | 161 |
| 20 | 0.044 | 98 | 68  | 51 | 131 |
| 30 | 0.022 | 99 | 63  | 51 | 122 |
| Ninety mole percent H₂S in first permeate-in-series retentate stream | | | | | |
| 5  | 0.39  | 81 | 251 | 53 | 527 |
| 10 | 0.16  | 92 | 99  | 53 | 218 |
| 20 | 0.057 | 97 | 83  | 52 | 153 |
| 30 | 0.031 | 98 | 74  | 52 | 137 |

[a]Percent H₂S from the feed-gas stream that is recovered in the second retentate-in-series retentate stream.

To illustrate the process of FIG. 3d, a feed-gas containing 2 mol % hydrogen sulfide and 98 mol % carbon dioxide was fed to a process having the configuration shown in FIG. 3d. The process in this configuration was simulated to achieve 20, 50, and 90 mol % hydrogen sulfide concentration in second membrane-stage retentate stream 371 (Table 4). In the simulations, the first retentate stream 361 had 2 mol % hydrogen sulfide. The two recycle streams, second membrane-stage permeate stream 372 and third membrane-stage retentate stream 381, each had 2 mol % hydrogen sulfide; and the first retentate stream 361 contained about 10 mol % hydrogen sulfide. When membranes having carbon dioxide-hydrogen sulfide selectivity of at least 10 are used, the process achieves suitable hydrogen sulfide concentration in the third membrane-stage permeate stream 382 to safely discharge the stream with no further treatment (other than catalytic or thermal oxidation). This configuration was capable of concentrating hydrogen sulfide in the second membrane-stage retentate stream 371 to about 90 mol % while recovering about 95-99% of the hydrogen sulfide from the feed-gas stream 301 (Table 4). In this process, the molar concentration of hydrogen sulfide in the feed-gas stream 301 is reduced by a factor of 20-30 compared with the concentration of hydrogen sulfide in the third membrane-stage permeate stream 382.

TABLE 4

Three-stage configuration performance: H₂S recovery using a feed-gas stream containing 2 mol % H₂S

| Selectivity | $H_2S$ in third MS permeate stream 382 (mol %) | Recovered $H_2S$ (%)[a] | Membrane area (m²) MS 360 | Membrane area (m²) MS 370 | Membrane area (m²) MS 380 | Theoretical compressor power (kW) Unit 365 | Theoretical compressor power (kW) Unit 375 |
|---|---|---|---|---|---|---|---|
| Twenty mole percent H₂S in second MS retentate stream | | | | | | | |
| 5  | 0.27  | 88 | 76 | 49 | 8 | 166 | 15 |
| 10 | 0.089 | 96 | 61 | 48 | 7 | 135 | 14 |

TABLE 4-continued

Three-stage configuration performance: $H_2S$ recovery using a feed-gas stream containing 2 mol % $H_2S$

| Selectivity | $H_2S$ in third MS permeate stream 382 (mol %) | Recovered $H_2S$ (%)[a] | Membrane area (m$^2$) MS 360 | MS 370 | MS 380 | Theoretical compressor power (kW) Unit 365 | Unit 375 |
|---|---|---|---|---|---|---|---|
| 20 | 0.028 | 99 | 55 | 48 | 7 | 123 | 13 |
| 30 | 0.014 | 99 | 53 | 48 | 7 | 119 | 13 |
| Fifty mole percent $H_2S$ in second MS retentate stream | | | | | | | |
| 5 | 0.29 | 86 | 88 | 52 | 18 | 191 | 31 |
| 10 | 0.091 | 96 | 65 | 511 | 14 | 145 | 24 |
| 20 | 0.028 | 99 | 59 | 51 | 12 | 130 | 21 |
| 30 | 0.014 | 99 | 57 | 51 | 12 | 126 | 21 |
| Ninety mole percent $H_2S$ in second MS retentate stream | | | | | | | |
| 5 | 0.32 | 84 | 108 | 53 | 39 | 235 | 64 |
| 10 | 0.0099 | 95 | 69 | 52 | 24 | 152 | 36 |
| 20 | 0.030 | 99 | 60 | 52 | 19 | 133 | 28 |
| 30 | 0.015 | 99 | 58 | 52 | 18 | 128 | 25 |

MS, membrane stage
[a]Percent $H_2S$ from the feed-gas stream that is recovered in the second retentate-in-series retentate stream.

The processes summarized in Tables 1-4 were carried out using a feed gas containing 2 mol % hydrogen sulfide. To illustrate the effectiveness of the processes with a feed having a greater concentration of hydrogen sulfide, additional simulations were carried out using a feed gas having about 10 mol % hydrogen sulfide.

The process of FIG. 3a was carried out using a feed gas with 10 mol % hydrogen sulfide and 90 mol % carbon dioxide (Table 5). In this configuration, even the most selective membrane for carbon dioxide-hydrogen sulfide separation (20) used with the lowest concentration of hydrogen sulfide (20 mol %) was not able to sufficiently reduce the concentration of hydrogen sulfide in the single-pass permeate stream 312 to allow safe discharge into the atmosphere without further treatment (other than by catalytic or thermal oxidation) (Table 5). However, this configuration can still be used with an additional polishing step.

TABLE 5

Single-pass membrane configuration performance: $H_2S$ recovery using a feed-gas stream containing 10 mol % $H_2S$

| Selectivity | $H_2S$ in single-pass permeate stream 312 (mol %) | Recovered $H_2S$ (%)[a] | Membrane area (m$^2$) |
|---|---|---|---|
| Twenty mole percent $H_2S$ in single-pass retentate stream | | | |
| 5 | 3.3 | 80 | 36 |
| 10 | 1.7 | 91 | 33 |
| 20 | 0.9 | 95 | 32 |
| 30 | 0.6 | 97 | 32 |
| Fifty mole percent $H_2S$ in single-pass retentate stream | | | |
| 5 | 5.1 | 55 | 57 |
| 10 | 2.8 | 76 | 56 |
| 20 | 1.4 | 88 | 56 |
| 30 | 1.0 | 92 | 55 |
| Ninety mole percent $H_2S$ in single-pass retentate stream | | | |
| 5 | 7.4 | 29 | 66 |
| 10 | 4.7 | 56 | 70 |
| 20 | 2.7 | 76 | 73 |
| 30 | 1.9 | 83 | 74 |

[a]Percent $H_2S$ from the feed-gas stream that is recovered in the single-pass retentate stream.

The process of FIG. 3b was carried out using a feed gas having 10 mol % hydrogen sulfide and 90 mol % carbon dioxide (Table 6). The first retentate-in-series membrane stage 320 produces a retentate stream, first retentate-in-series retentate stream 321, which has 20 mol % hydrogen sulfide. Between about 92-98% of the hydrogen sulfide from the feed gas is recovered and concentrated in second retentate-in-series retentate stream 331 after processing in the second retentate-in-series membrane stage 330 (Table 6). This stream is sent to a sulfur recovery unit to be processed for sulfur recovery. Between about 0.2-0.9 mol % hydrogen sulfide remains in the second retentate-in-series permeate stream 332 making it unsuitable for discharging into the atmosphere without further treatment.

TABLE 6

Two-stage retentate-in-series configuration performance: $H_2S$ recovery using a feed-gas stream containing 10 mol % $H_2S$

| Selectivity | $H_2S$ in first retentate-in-series permeate stream 322 (mol %) | Recovered $H_2S$ (%)[a] | Membrane area (m$^2$) MS 320 | MS 330 | Theoretical compressor power (kW) |
|---|---|---|---|---|---|
| Fifty mole percent $H_2S$ in second retentate-in-series retentate stream | | | | | |
| 5 | 3.21 | 73 | 51 | 28 | 45 |
| 10 | 0.91 | 93 | 47 | 68 | 119 |
| 20 | 0.44 | 96 | 46 | 61 | 105 |
| 30 | 0.29 | 98 | 46 | 59 | 101 |
| Ninety mole percent $H_2S$ in second retentate-in-series retentate stream | | | | | |
| 5 | 3.67 | 66 | 56 | 70 | 100 |
| 10 | 0.94 | 92 | 52 | 114 | 175 |
| 20 | 0.44 | 96 | 51 | 93 | 134 |
| 30 | 0.29 | 97 | 51 | 87 | 123 |

MS, membrane stage
[a]Percent $H_2S$ from the feed-gas stream that is recovered in the second retentate-in-series retentate stream.

The process of FIG. 3c was simulated using a feed gas having 10 mol % hydrogen sulfide and 90 mol % carbon dioxide (Table 7). The second permeate-in-series membrane stage 350 produced a second permeate-in-series retentate stream 351 having 10 mol % hydrogen sulfide. In this configuration, the process is capable of producing a hydrogen sulfide-enriched stream, first permeate-in-series retentate stream 341, with a concentration of hydrogen sulfide that is sufficiently high to be processed in the Claus plant of a sulfur recovery unit. The process is also capable of producing a hydrogen sulfide-stripped stream, second permeate-in-series permeate stream 352, that has a sufficiently low concentration of hydrogen sulfide to be safely discharged to the atmosphere without further treatment (other than by catalytic or thermal oxidation).

TABLE 7

Two-stage permeate-in-series configuration performance: $H_2S$ recovery using a feed-gas stream containing 10 mol % $H_2S$

| Selectivity | $H_2S$ in second permeate-in-series permeate stream 352 (mol %) | Recovered $H_2S$ (%)[a] | Membrane area ($m^2$) MS 340 | MS 350 | Theoretical compressor power (kW) |
|---|---|---|---|---|---|
| Twenty mole percent $H_2S$ in first permeate-in-series retentate stream ||||||
| 5  | 1.18  | 94   | 42  | 29 | 85  |
| 10 | 0.39  | 98   | 36  | 28 | 74  |
| 20 | 0.13  | 99   | 34  | 27 | 68  |
| 30 | 0.063 | 99.7 | 33  | 27 | 67  |
| Fifty mole percent $H_2S$ in first permeate-in-series retentate stream ||||||
| 5  | 1.55  | 87   | 90  | 46 | 168 |
| 10 | 0.54  | 96   | 70  | 45 | 131 |
| 20 | 0.18  | 99   | 62  | 44 | 114 |
| 30 | 0.093 | 99.2 | 60  | 44 | 109 |
| Ninety mole percent $H_2S$ in first permeate-in-series retentate stream ||||||
| 5  | 1.94  | 82   | 191 | 52 | 331 |
| 10 | 0.75  | 93   | 117 | 51 | 190 |
| 20 | 0.27  | 97   | 94  | 50 | 145 |
| 30 | 0.143 | 98.7 | 88  | 49 | 133 |

[a] Percent $H_2S$ from the feed-gas stream that is recovered in the second retentate-in-series retentate stream.

The process of FIG. 3d was also simulated using a feed gas having 10 mol % hydrogen sulfide and 90 mol % carbon dioxide (Table 8). In this simulation, the first retentate stream 361 contained 20 mol % hydrogen sulfide. The two recycle streams, second membrane-stage permeate stream 372 and third membrane-stage retentate stream 381, each contained 10 mol % hydrogen sulfide. The process was capable of producing a hydrogen sulfide-enriched stream, second membrane-stage retentate stream 371, suitable for sending to the Claus plant of a sulfur recovery unit. The process was also capable of producing a hydrogen sulfide-stripped stream, third membrane-stage permeate stream 382 suitable for safely discharging to the atmosphere without additional treatment (other than catalytic or thermal oxidation). In some instances, the process was also capable of recovering as much as 99-99.5% of hydrogen sulfide from the feed gas and concentrating it in second membrane-stage retentate stream 371. However, this configuration required the most membrane area and compressor power of the configurations shown in FIG. 3.

TABLE 8

Three-stage configuration performance: $H_2S$ recovery using a feed-gas stream containing 2 mol % $H_2S$

| Selectivity | $H_2S$ in third MS permeate stream 382 (mol %) | Recovered $H_2S$ (%)[a] | Membrane area ($m^2$) MS 360 | MS 370 | MS 380 | Theoretical compressor power (kW) Unit 365 | Unit 375 |
|---|---|---|---|---|---|---|---|
| Fifty mole percent $H_2S$ in second MS retentate stream ||||||||
| 5  | 1.16  | 90   | 64 | 34 | 45 | 129 | 56 |
| 10 | 0.367 | 97   | 55 | 29 | 44 | 112 | 45 |
| 20 | 0.114 | 99   | 52 | 26 | 43 | 105 | 40 |
| 30 | 0.057 | 99.5 | 51 | 25 | 43 | 103 | 39 |
| Ninety mole percent $H_2S$ in second MS retentate stream ||||||||
| 5  | 1.26  | 88   | 75 | 95 | 50 | 151 | 134 |
| 10 | 0.384 | 97   | 62 | 64 | 49 | 125 | 78  |
| 20 | 0.115 | 99   | 58 | 53 | 48 | 116 | 60  |
| 30 | 0.057 | 99.5 | 56 | 51 | 48 | 114 | 55  |

MS, membrane stage
[a] Percent $H_2S$ from the feed-gas stream that is recovered in the second retentate-in-series retentate stream.

Figure 4:
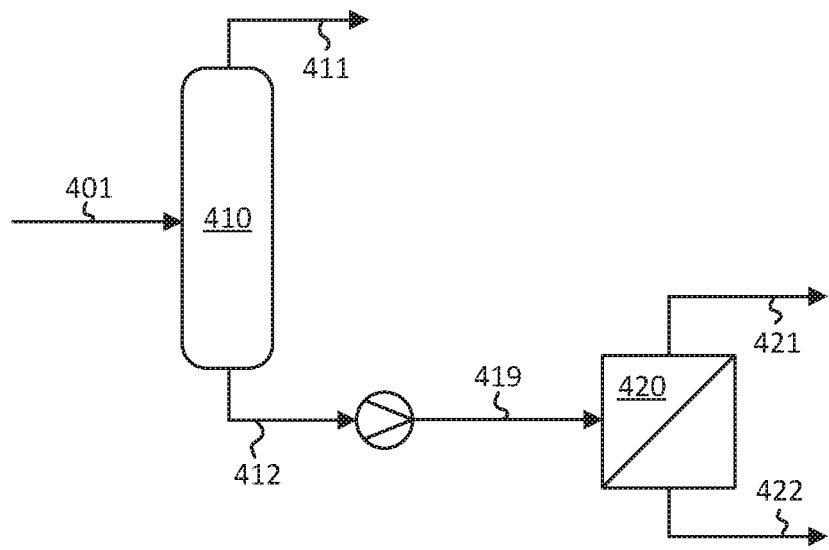
FIG. 4 is a process flow diagram of an embodiment of a process for recovering sulfur and carbon dioxide from syngas using a nonselective amine absorption unit and a membrane separation unit.

The membrane configurations shown in FIG. 3 are used in a larger process for recovering sulfur from syngas. An example of such a process for recovering sulfur from syngas is shown in FIG. 4. In FIG. 4, syngas stream 401 is introduced to nonselective amine absorption unit 410 where it is treated using nonselective amine absorption to obtain overhead gas stream 411 and acid gas stream 412. Acid gases in syngas stream 401 can include hydrogen sulfide, carbon dioxide, and combinations of the same. Contaminants in syngas stream 401 can include BTX, carbonyl sulfide (COS), carbon disulfide ($CS_2$), thiols (R-SH), water, and combinations of the same. In at least one embodiment syngas stream 401 contains syngas, hydrogen sulfide, carbon dioxide, BTX, COS, $CS_2$, R-SH, water, and combinations of the same.

The overhead gas stream 411 produced by nonselective amine absorption unit 410 contains syngas and typically also contains between about 0-4 ppm hydrogen sulfide and about 1-3 mol % carbon dioxide, which is suitable for use in many processes. The concentration of hydrogen sulfide in syngas stream 401 can be between about 1 and 1,000 ppm, alternately between about 1 and 500 ppm, alternately between about 1 and 100 ppm, alternately between about 1 and 50 ppm, alternately between about 1 and 10 ppm, alternately between about 1 and 5 ppm. Gases containing greater than 10 ppm hydrogen sulfide usually require further treatment before they can be used in other processes.

Acid gas stream 412 is recovered at a reduced pressure and contains nearly all hydrogen sulfide and carbon dioxide introduced by syngas stream 401 along with some contaminants. An example of a typical syngas stream could include about 30 mol % carbon dioxide and about 1 mol % hydrogen sulfide. The acid gas stream 412 obtained from processing such a stream in nonselective amine absorption unit 410 could contain about 3-5 mol % hydrogen sulfide and about 95-97 mol % carbon dioxide. The concentration of hydrogen sulfide in this stream is too low to process in a Claus plant, so acid gas stream 412 is compressed and sent to membrane separation unit 420 to obtain a concentrated hydrogen sulfide stream, enriched hydrogen sulfide stream 421.

Membrane separation unit 420 can have at least one carbon dioxide-selective membrane in one or more membrane stages configured according to any of the processes shown in FIG. 3. The membrane separation unit 420 separates the acid gas stream 412 using a carbon dioxide-selective membrane to obtain enriched hydrogen sulfide stream 421 and hydrogen sulfide-stripped stream 422. The enriched hydrogen sulfide stream 421 contains hydrogen sulfide, and can contain carbon dioxide and other contaminants. According to at least one embodiment, the enriched hydrogen sulfide stream 421 can be entirely processed in the Claus plant of a sulfur recovery unit, without any stream being directly supplied to a catalytic converter without first passing through the initial furnace of a Claus plant. If the concentration of hydrogen sulfide in the enriched hydrogen sulfide stream 421 is sufficiently high (at least about 50 mol %, preferably at least about 90 mol %) a suitable temperature can be achieved in the furnace of the Claus plant to destroy contaminants in the stream.

According to at least one embodiment, the enriched hydrogen sulfide stream 421 contains at least about 20 mol % hydrogen sulfide, preferably at least about 50 mol % hydrogen sulfide, more preferably at least about 90 mol % hydrogen sulfide. The hydrogen sulfide-stripped stream 422 can contain carbon dioxide. According to at least one embodiment, the hydrogen sulfide-stripped stream 422 contains at least about 80 mol % carbon dioxide, more preferably at least about 90 mol % carbon dioxide, even more preferably at least about 98 mol % carbon dioxide, even more preferably at least about 99 mol % carbon dioxide, most preferably at least about 99.9 mol % carbon dioxide. According to at least one embodiment, the hydrogen sulfide-stripped stream 422 can contain between about 99.95-99.99 mol % carbon dioxide.

Hydrogen sulfide-stripped stream 422 can be used in various applications depending on its composition, regulatory, economic, and other considerations. According to at least one embodiment, hydrogen sulfide-stripped stream 422 can be discharged to the atmosphere without additional treatment (other than oxidation). According to at least one embodiment, the hydrogen sulfide-stripped stream 422 can be used in enhanced oil recovery operations. According to at least one embodiment, the hydrogen sulfide-stripped stream 422 can be sequestered.

Figure 5:
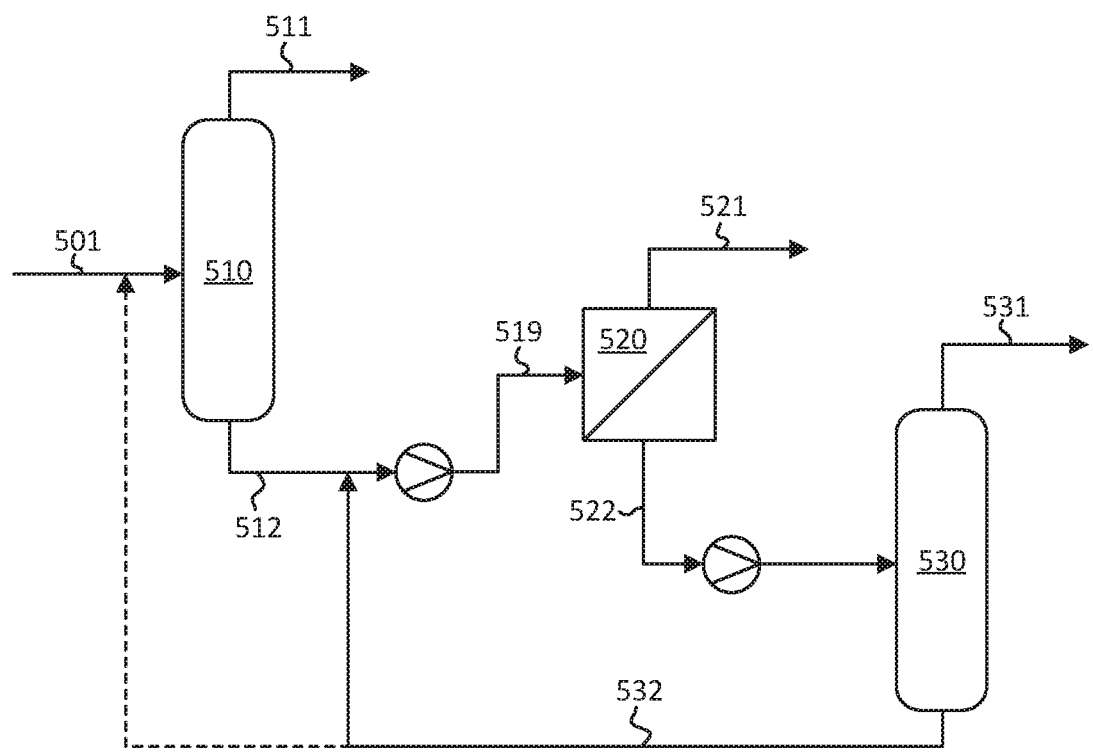
FIG. 5 is a process flow diagram of an embodiment of a process for recovering sulfur and carbon dioxide from syngas using a nonselective amine absorption unit, a membrane separation unit, and a selective amine absorption unit.

In FIG. 5, a process similar to the process of FIG. 4 is provided. Between FIG. 4 and FIG. 5, units and streams having like numbers have similar descriptions. The process of FIG. 5 includes a selective amine absorption unit 530 which is provided to treat the hydrogen sulfide-stripped stream 522. The hydrogen sulfide-stripped stream 522 is compressed and fed to the selective amine absorption unit 530 which can use a selective absorbent such as MDEA remove remaining hydrogen sulfide in the hydrogen sulfide-stripped stream 522 and concentrate it into recovered hydrogen sulfide stream 532 and obtain overhead carbon dioxide stream 531. According to at least one embodiment, hydrogen sulfide content in recovered hydrogen sulfide stream 532 can be increased by a factor of about ten when compared to the concentration of hydrogen sulfide in hydrogen sulfide-stripped stream 522. The overhead carbon dioxide stream 531 can be substantially free (i.e., less than about 0.01 mol %) of hydrogen sulfide. The recovered hydrogen sulfide stream 532 can be combined with acid gas stream 512 to be compressed and recycled through the membrane separation unit 520. Alternatively, the recovered hydrogen sulfide stream 532 can be combined with syngas stream 501 to be recycled through the process.

Advantageously, having nonselective amine absorption unit 510 and membrane separation unit 520 upstream of selective amine absorption unit 530 can make it possible to use relatively smaller equipment to carry out the selective amine absorption process in selective amine absorption unit 530, significantly reducing equipment costs.

Figure 6:
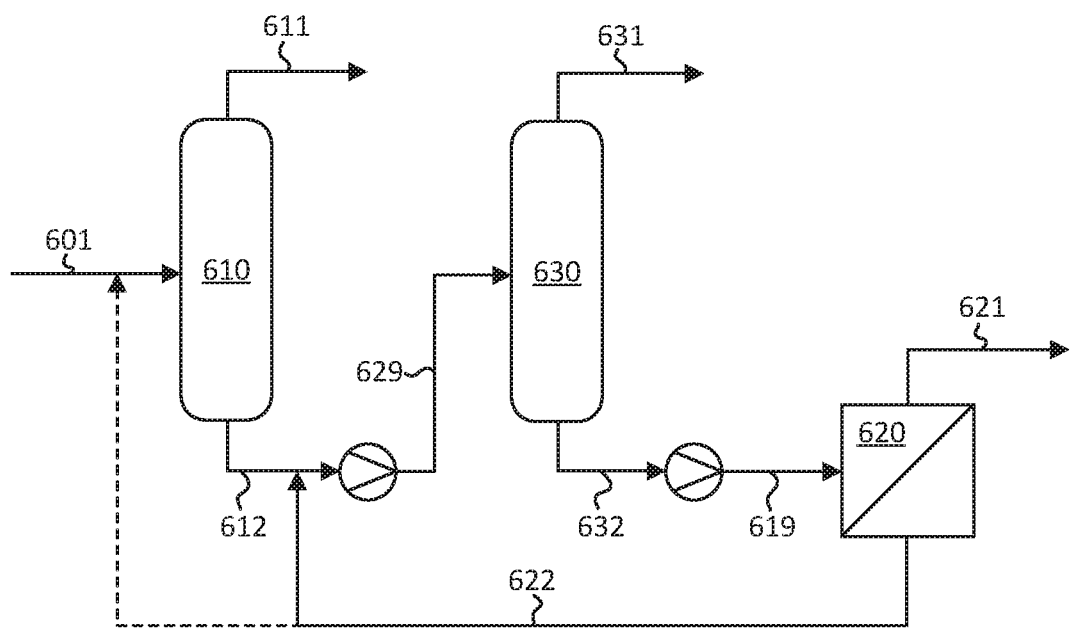
FIG. 6 is a process flow diagram of an embodiment of a process for recovering sulfur and carbon dioxide from syngas using a nonselective amine absorption unit, a selective amine absorption unit, and a membrane separation unit.

Another process for recovering sulfur from syngas is provided in FIG. 6. Units and streams in FIG. 6 having like numbers with units and streams in FIG. 4 and FIG. 5 also share similar descriptions, though they may be configured differently. In FIG. 6, acid gas stream 612 is compressed and fed to selective amine absorption unit 630 to carry out polishing of the acid gas stream 612. The recovered hydrogen sulfide stream 632 is then compressed and fed to membrane separation unit 620 to obtain hydrogen sulfide-stripped stream 622 which is combined with acid gas stream 612 to be compressed and recycled through the selective amine absorption unit 630 and membrane separation unit 620. Alternatively, the hydrogen sulfide-stripped stream 622 can be combined with syngas stream 601 to be recycled through the process.

EXAMPLES

The following examples are included to demonstrate embodiments of the disclosure, and should be considered nonlimiting. Certain examples represent techniques, systems, compositions, and apparatuses discovered to function well in the practice of the disclosure, and thus can be considered to constitute modes for its practice. Changes can be made to the embodiments disclosed in the examples without departing from the spirit and scope of the disclosure. In the examples, units and streams identified with like numbers can have similar descriptions though they may be configured differently.

Example 1

Sulfur Enrichment Using Permeate-in-Series Membrane Separation

Figure 7:
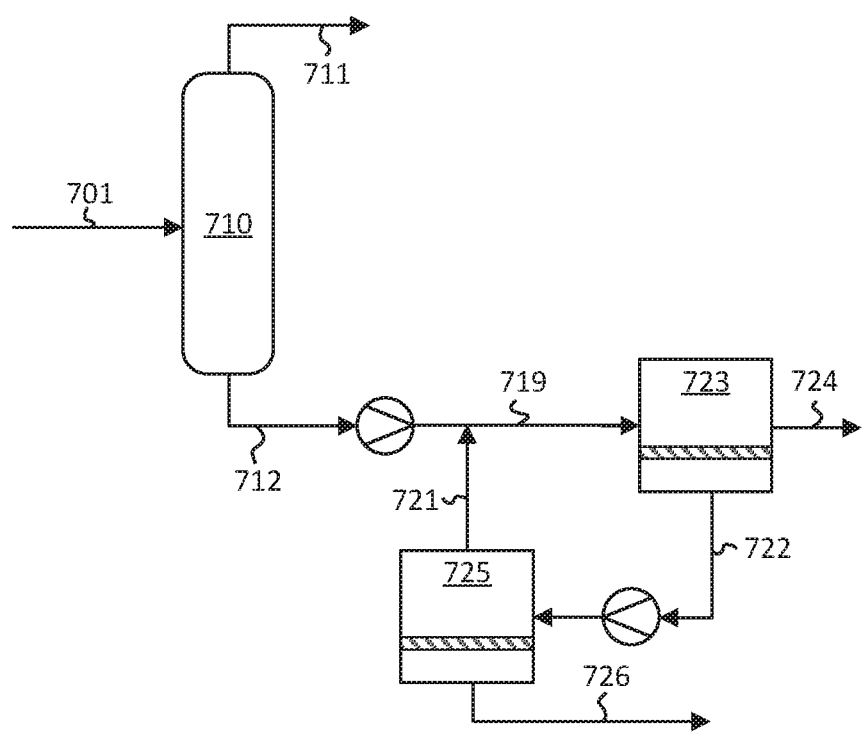
FIG. 7 is a process flow diagram of an embodiment of a process for recovering sulfur and carbon dioxide from syngas using a nonselective amine absorption unit, and two membrane stages arranged with a permeate-in-series configuration.

A simulation of a process for enriching sulfur from syngas to be fed to a sulfur recovery unit was carried out using the configurations shown in FIG. 4 and FIG. 3c (Table 9). The system and process are shown in FIG. 7. In this example, a conventional syngas 701 containing about 1 mol % hydrogen sulfide and about 30 mol % carbon dioxide was fed to the nonselective amine absorption unit 710. The syngas was treated using a cold methanol absorption process, which produced an overhead syngas stream 711 containing about 1.4 ppm hydrogen sulfide and about 0.9 mol % carbon dioxide and an acid gas stream. The overhead syngas stream is suitable for some coal-to-chemical processes. In some applications, the overhead syngas might be further treated using zinc oxide to further sweeten the syngas. Water may also be removed using a molecular sieve or silica gel.

The acid gas stream 712 contained about 3.3 mol % hydrogen sulfide, and was compressed and then separated using a permeate-in-series membrane separation configuration. The first and second membrane stages 723 and 725 were fitted with membranes having about 500 gpu carbon dioxide permeance and about 25 gpu hydrogen sulfide permeance, and carbon dioxide-hydrogen sulfide selectivity of about 20. The first membrane stage 723 produced a first retentate stream 724 that contained about 20 mol % hydrogen sulfide, which is suitable for processing in a Claus plant. The first permeate stream 722 contained about 0.41 mol % hydrogen sulfide, which is not suitable for safely discharging to the atmosphere. The first permeate stream 722 was compressed and sent to the second membrane stage 725 to obtain a second retentate stream 721 suitable for recycling to the first membrane separation stage and a second permeate stream 726. The second permeate stream 726 contained only about 580 ppm hydrogen sulfide, and was suitable for discharging to the atmosphere after minimal treatment (e.g., catalytic or thermal oxidation and then stripping sulfur dioxide using a lime stripper) or as is.

TABLE 9

Stream compositions: Sulfur enrichment from syngas using two-stage permeate-in-series membrane stage configuration.

| | Concentration (mol %) | | | | Flow rate | Pressure |
|---|---|---|---|---|---|---|
| | $CO_2$ | $H_2S$ | CO | $H_2$ | ($10^3$ m$^3$/h) | (bar)[a] |
| Syngas stream 701 | 30.0 | 1.0 | 25.0 | 44.0 | 10 | 50 |
| Overhead syngas stream 711 | 0.9 | 1.4[b] | 35.9 | 63.2 | 6.9 | 50 |
| Acid gas stream 712 | 95.6 | 3.3 | 0.08 | 0.07 | 3.0 | 20 |
| First retentate stream 724 | 79.5 | 20.0 | 0.5 | 0.0 | 0.49 | 20 |
| Second permeate stream 726 | 99.85 | 0.058 | 0.0 | 0.1 | 2.5 | 1.0 |
| First permeate stream 722 | 99.5 | 0.41 | 0.01 | 0.08 | 2.8 | 20 |
| Second retentate stream 721 | 94.9 | 5.0 | 0.13 | 0.0 | 0.19 | 20 |

[a]Absolute pressure.
[b]Parts per million.

Example 2

Sulfur Enrichment Using Shifted Syngas with Two-Stage Permeate-in-Series Membrane Separation A simulation was carried out using dry shifted syngas with the configuration used in Example 1 and shown in FIG. 7 (Table 10). Hydrogen ($H_2$) can be obtained from syngas using the water gas shift reaction by reacting carbon monoxide with water to obtain carbon dioxide and hydrogen. After carrying out the water gas shift reaction, the dry shifted syngas stream 701 contains about 0.5 mol % carbon monoxide, about 0.5 mol % hydrogen sulfide, about 45 mol % carbon dioxide, and about 55 mol % hydrogen. The dry shifted syngas stream 701 was treated in nonselective amine absorption unit 710 to obtain overhead syngas stream 711 containing about 0.9 ppm hydrogen sulfide, about 1.6 mol % carbon dioxide, about 0.9 mol % carbon monoxide, and about 97.5 mol % hydrogen. The overhead syngas stream 711 can be used to fuel a gas turbine or treated using pressure swing absorption to obtain hydrogen suitable for use in a fuel cell. The acid gas stream 712 from the nonselective amine absorption unit 710 is then processed using the two-stage permeate-in-series membrane separation unit. In this example, the concentration of hydrogen sulfide in the first retentate stream 724 and the second permeate stream 726 is about 90 mol % and 620 ppm respectively. The second permeate stream 726 is suitable for being safely discharged into the atmosphere after oxidation and optionally using a scrubber to remove sulfur dioxide.

Example 3

Figure 8:
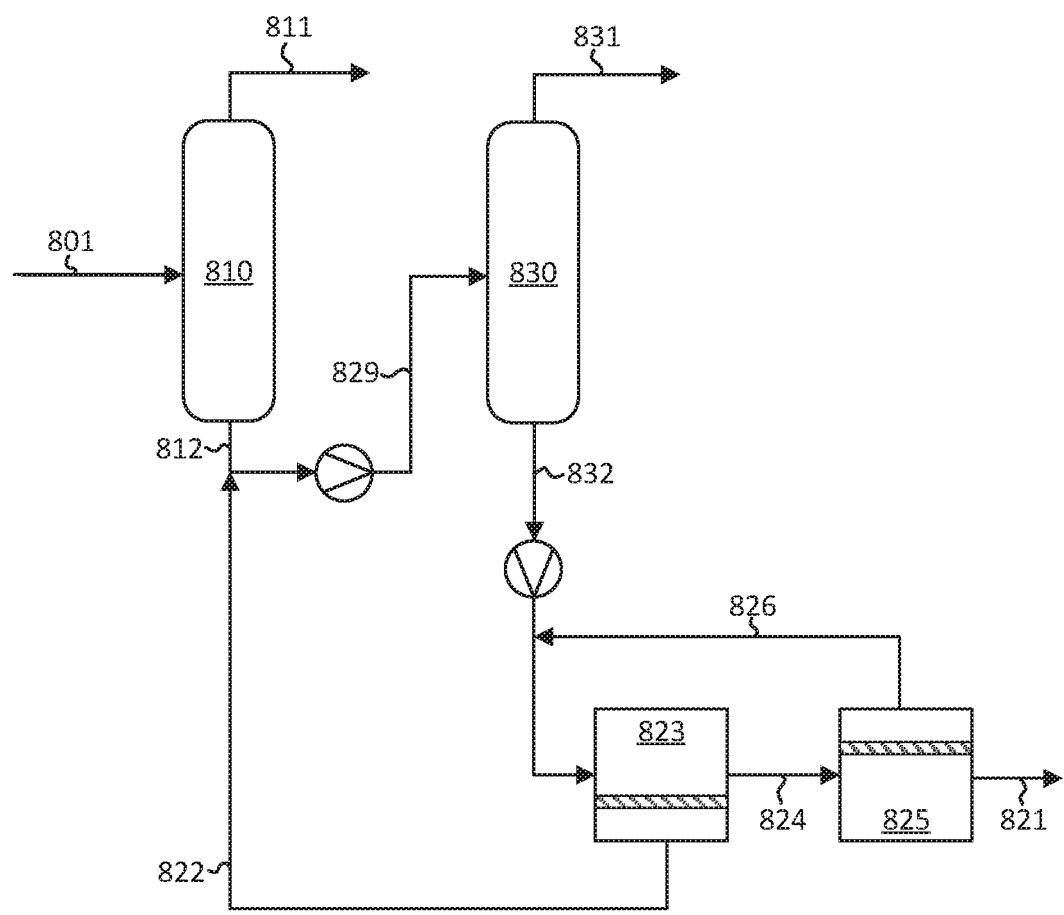
FIG. 8 is a process flow diagram of an embodiment of a process for recovering sulfur and carbon dioxide from syngas using a nonselective amine absorption unit, a selective amine absorption unit, and two membrane stages arranged with a retentate-in-series configuration.

Nonselective Amine Absorption in Series with Selective Amine Absorption, Followed by Two-Stage Membrane Separation Using Retentate-in-Series Configuration At many locations the second permeate stream 726 of Example 2 has a concentration of hydrogen sulfide that is either near the regulatory limit for oxidation and discharge into the atmosphere, or it exceeds the regulatory limit. The concentration of hydrogen sulfide in the carbon dioxide-enriched stream can be reduced using a selective amine absorption unit. A simulation was carried out using a configuration similar to FIG. 6 and FIG. 3b, and the process is shown in FIG. 8 (Table 11). In FIG. 8, syngas stream 801 is treated in nonselective amine absorption unit 810, and the acid gas stream 812 is then compressed and sent to selective amine absorption unit 830 to obtain overhead carbon dioxide stream 831 and recovered hydrogen sulfide stream 832. The recovered hydrogen sulfide stream 832 is compressed and sent to the membrane separation unit, which includes two membrane stages, 823 and 825, with retentate in series.

The nonselective amine absorption unit 810 can use Rectisol®+Selexol®, or MEA to obtain overhead syngas stream 811 having less than about 4 ppm hydrogen sulfide, which can then be treated using a zinc oxide bed or other chemical scrubbing process to further reduce the hydrogen sulfide to about 0-0.2 ppm. An example of a suitable selective amine absorption unit 830 can be an amine absorption system using MDEA. About 65 mol % of the carbon

TABLE 10

Stream compositions: Sulfur enrichment from dry shifted syngas using two-stage permeate-in-series membrane stage configuration.

| | Concentration (mol %) | | | | Flow rate | Pressure |
|---|---|---|---|---|---|---|
| | $CO_2$ | $H_2S$ | CO | $H_2$ | ($10^3$ m$^3$/h) | (bar)[a] |
| Syngas stream 701 | 45.0 | 0.5 | 0.5 | 54.0 | 10 | 50 |
| Overhead syngas stream 711 | 1.6 | 0.9[b] | 0.9 | 97.5 | 5.5 | 50 |
| Acid gas stream 712 | 98.8 | 1.1 | 0.0 | 0.06 | 4.5 | 5 |
| First retentate stream 724 | 9.9 | 90.0 | 0.12 | 0.0 | 0.52 | 20 |
| Second permeate stream 726 | 99.9 | 620[b] | 0.0 | 0.06 | 4.4 | 1.0 |
| First permeate stream 722 | 00.5 | 0.46 | 0.0 | 0.06 | 4.8 | 1.0 |
| Second retentate stream 721 | 95.0 | 5.0 | 0.0 | 0.0 | 0.38 | 20 |

[a]Absolute pressure.
[b]Parts per million.

dioxide from the syngas stream 801 was removed using the selective amine absorption unit 830 to obtain overhead carbon dioxide stream 831 which contained about 56 ppm hydrogen sulfide. The concentration of hydrogen sulfide in the overhead carbon dioxide stream 831 was sufficiently low to allow it to be safely discharged after being oxidized.

The recovered hydrogen sulfide stream 832 was then treated using two membrane stages with retentate in series. In this example, the membrane stages were fitted with membranes having about 500 gpu carbon dioxide permeance and about 25 gpu hydrogen sulfide permeance. The second retentate stream 821 was enriched in hydrogen sulfide and was suitable for processing in a Claus plant. The first permeate stream 822 was combined with the acid gas stream 812 to be compressed and recycled through the selective amine absorption unit 830 and membrane stages 823 and 825; and the second permeate stream 826 was combined with the recovered hydrogen sulfide stream 832 to be recycled through the membrane stages 823 and 825.

The overhead carbon dioxide stream 831 has a concentration of hydrogen sulfide that is more suitable for safely discharging to the atmosphere than the second permeate stream 726 of Example 2. Moreover, the membrane separation stages 823 and 825 in this configuration can be relatively smaller than those used in Example 2 because much of the carbon dioxide introduced by syngas stream 801 is removed by the selective amine absorption unit 830, resulting in significantly reduced equipment costs.

highly concentrated hydrogen sulfide stream for a Claus plant (Table 12). The overhead syngas stream 911 contained about 1 ppm hydrogen sulfide and about 1.3 mol % carbon dioxide, and the acid gas stream 912. The overhead syngas stream 911 was suitable for use in other chemical processes, and the acid gas stream 912 was compressed and sent to be separated using a two-stage retentate-in-series membrane separation configuration. The second retentate stream 921 from second membrane stage 925 contained about 90 mol % hydrogen sulfide, which suitable for processing in a Claus plant. Streams with such high concentrations of hydrogen sulfide are suitable for reaching temperatures in the furnace of the Claus plant sufficient to destroy contaminants in the feed gas to the Claus plant.

The first permeate stream 922 from first membrane stage 923 was sent to selective amine absorption unit 930 to be separated using selective amine absorption and to obtain overhead carbon dioxide stream 931 and recovered hydrogen sulfide stream 932. The overhead carbon dioxide stream 931 contained about 17 ppm hydrogen sulfide, which is sufficiently low to be safely discharged directly to the atmosphere, or discharged after oxidation. The recovered hydrogen sulfide stream 932 from selective amine absorption unit 930 and second permeate stream 926 from second membrane stage 925 were combined with acid gas stream 912 to be compressed and recycled through the membrane separation stages 923 and 925 and selective amine absorption unit 930.

TABLE 11

Stream compositions: Using a nonselective amine absorption unit and a selective amine absorption unit in series, and two membrane stages with retentate in series.

|  | Concentration (mol %) | | | | Flow rate | Pressure |
| --- | --- | --- | --- | --- | --- | --- |
|  | $CO_2$ | $H_2S$ | CO | $H_2$ | ($10^3$ $m^3$/h) | (bar)[a] |
| Syngas stream 801 | 30.0 | 0.3 | 25.0 | 44.7 | 10 | 50 |
| Overhead syngas stream 811 | 1.3 | 4[b] | 35.4 | 63.3 | 7.1 | 50 |
| Second retentate stream 821 | 10.0 | 90.0 | 0.00 | 0.00 | 0.033 | 20.0 |
| Overhead $CO_2$ stream 831 | 99.7 | 56[b] | 0.08 | 0.15 | 2.9 | 2.0 |
| Recovered $H_2S$ stream 832 | 97.4 | 2.6 | 0.00 | 0.00 | 1.3 | 2.0 |
| First permeate stream 822 | 99.7 | 0.26 | 0.00 | 0.00 | 1.2 | 1.0 |
| First retentate stream 824 | 90.0 | 10.0 | 0.00 | 0.00 | 0.4 | 20.0 |

[a]Absolute pressure.
[b]Parts per million.

Example 4

Figure 9:
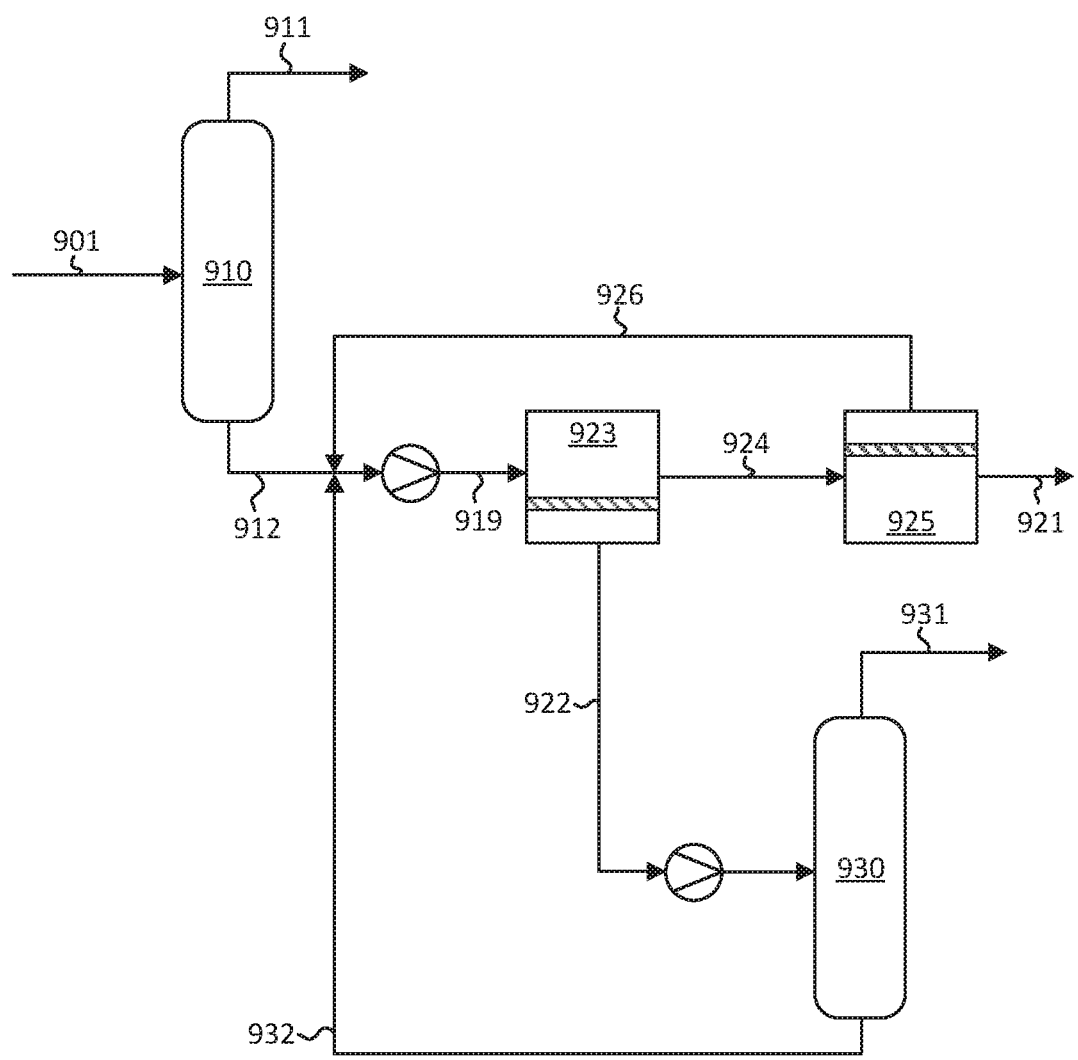
FIG. 9 is a process flow diagram of an embodiment of a process for recovering sulfur and carbon dioxide from syngas using a nonselective amine absorption unit, two membrane stages arranged with a retentate-in-series configuration, and a selective amine absorption unit.

Nonselective Amine Absorption with Two-Stage Membrane Separation Using Retentate-in-Series, Followed by Selective Amine Absorption A simulation was carried out using the configurations of FIG. 5 and FIG. 3b, as illustrated in FIG. 9, to obtain a

TABLE 12

Stream compositions: Using a nonselective amine absorption unit with two-stage membrane separation using retentate-in-series, followed by selective amine absorption.

|  | Concentration (mol %) | | | | Flow rate | Pressure |
| --- | --- | --- | --- | --- | --- | --- |
|  | $CO_2$ | $H_2S$ | CO | $H_2$ | ($10^3$ $m^3$/h) | (bar)[a] |
| Syngas stream 901 | 30.0 | 1.0 | 25.0 | 44.0 | 10 | 50 |
| Overhead syngas stream 911 | 1.29 | 1.44[b] | 35.8 | 62.9 | 7.0 | 50 |
| Second retentate stream 921 | 8.0 | 90.0 | 2.00 | 0.00 | 0.11 | 20.0 |
| Overhead $CO_2$ stream 931 | 99.8 | 17[b] | 0.01 | 0.15 | 2.9 | 2.0 |
| Acid gas stream 912 | 96.5 | 3.3 | 0.08 | 0.15 | 3.0 | 2.0 |

TABLE 12-continued

Stream compositions: Using a nonselective amine absorption unit with two-stage membrane separation using retentate-in-series, followed by selective amine absorption.

| | Concentration (mol %) | | | | Flow rate | Pressure |
|---|---|---|---|---|---|---|
| | $CO_2$ | $H_2S$ | CO | $H_2$ | ($10^3$ m$^3$/h) | (bar)$^a$ |
| Compressed stream 919 | 96.8 | 3.0 | 0.07 | 0.09 | 5.0 | 20.0 |
| First permeate stream 922 | 99.6 | 0.29 | 0.01 | 0.12 | 3.6 | 1.0 |
| First retentate stream 924 | 89.8 | 10.0 | 0.22 | 0.00 | 1.4 | 20.0 |

$^a$Absolute pressure.
$^b$Parts per million.

Although the present embodiments have been described in detail, it should be understood that various changes, substitutions, and alterations can be made hereupon without departing from the principle and scope of the disclosure. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A process for sweetening a syngas stream, the process comprising the steps of:
supplying a syngas stream to a nonselective absorption unit, the syngas stream comprising syngas, carbon dioxide, and hydrogen sulfide;
separating the syngas stream in the nonselective absorption unit to obtain an overhead syngas stream and an acid gas stream;
introducing the acid gas stream to a membrane separation unit, the acid gas stream comprising hydrogen sulfide and carbon dioxide;
separating the acid gas stream in the membrane separation unit to produce a retentate stream and a permeate stream, wherein the retentate stream comprises hydrogen sulfide, wherein the permeate stream comprises carbon dioxide;
introducing the retentate stream to a sulfur recovery unit; and
supplying the permeate stream to a selective amine absorption unit and treating the permeate stream using an amine absorption process to obtain an overhead carbon dioxide stream and a recovered hydrogen sulfide stream.

2. The process of claim 1, wherein a concentration of hydrogen sulfide in the retentate stream is between 50 mol % and 95 mol %.

3. The process of claim 1, wherein the concentration of hydrogen sulfide in the retentate stream is greater than 90 mol %.

4. The process of claim 1, wherein a concentration of hydrogen sulfide in the permeate stream is between 0.01 mol % and 0.1 mol %.

5. The process of claim 1, wherein a concentration of hydrogen sulfide in the overhead syngas stream is between 1 ppm and 1,000 ppm.

6. The process of claim 1, wherein a concentration of carbon dioxide in the overhead syngas stream is between 1 mol % and 3 mol %.

7. The process of claim 1, wherein the membrane separation unit comprises a membrane, wherein the membrane is a carbon dioxide-selective membrane.

8. The process of claim 7, wherein the membrane has carbon dioxide-hydrogen sulfide selectivity of at least 5.

9. The process of claim 7, wherein the membrane has carbon dioxide-hydrogen sulfide selectivity of at least 10.

10. The process of claim 7, wherein the membrane has carbon dioxide-hydrogen sulfide selectivity of at least 20.

11. The process of claim 7, wherein the membrane has carbon dioxide-hydrogen sulfide selectivity of at least 30.

12. The process of claim 7, wherein the membrane comprises a perfluorinated polymer.

13. The process of claim 1, wherein the membrane separation unit comprises a first membrane separation stage and a second membrane separation stage with the first and second membrane separation stages arranged in a retentate-in-series configuration.

14. The process of claim 1, wherein the membrane separation unit comprises a first membrane separation stage and a second membrane separation stage with the first and second membrane separation stages arranged in a permeate-in-series configuration.

15. The process of claim 1, further comprising the step of:
discharging the overhead carbon dioxide stream to the atmosphere without subjecting the overhead carbon dioxide stream to any additional hydrogen sulfide separation.

16. A process for recovering sulfur and carbon dioxide from a syngas stream, the process comprising the steps of:
supplying a syngas stream to a nonselective absorption unit, the syngas stream comprising syngas, carbon dioxide, and hydrogen sulfide;

separating the syngas stream in the nonselective absorption unit using an absorption process to produce an overhead syngas stream and an acid gas stream;

introducing the acid gas stream to a selective absorption unit;

processing the acid gas stream in the selective absorption unit to obtain an overhead carbon dioxide stream and a recovered hydrogen sulfide stream;

introducing the recovered hydrogen sulfide stream to a membrane separation unit, the recovered hydrogen sulfide stream comprising hydrogen sulfide and carbon dioxide;

separating the recovered hydrogen sulfide stream in the membrane separation stage to produce a retentate stream and a permeate stream, wherein the retentate stream comprises hydrogen sulfide, wherein the permeate stream comprises carbon dioxide; and introducing the retentate stream to a sulfur recovery unit.

17. The process of claim 16, wherein a concentration of hydrogen sulfide in the retentate stream is between 50 mol % and 95 mol %.

18. The process of claim 16, wherein a concentration of hydrogen sulfide in the overhead carbon dioxide stream is between 0.01 mol % and 0.1 mol %.

19. The process of claim 16, further comprising the step of discharging the overhead carbon dioxide stream to the atmosphere without subjecting the overhead carbon dioxide stream to any additional hydrogen sulfide separation.

20. The process of claim 16, wherein the membrane separation unit comprises a membrane, wherein the membrane is a carbon dioxide-selective membrane.

21. The process of claim 20, wherein the membrane has carbon dioxide-hydrogen sulfide selectivity of at least 5.

22. The process of claim 16, wherein the membrane separation unit comprises a first membrane separation stage and a second membrane separation stage with the first and second membrane separation stages arranged in a retentate-in-series configuration.

23. The process of claim 16, wherein the membrane separation unit comprises a first membrane separation stage and a second membrane separation stage with the first and second membrane separation stages arranged in a permeate-in-series configuration.

* * * * *